(12) United States Patent
Gillenwater et al.

(10) Patent No.: US 6,691,253 B1
(45) Date of Patent: Feb. 10, 2004

(54) SYSTEM AND METHOD FOR SEQUENCING AND PERFORMING VERY HIGH SPEED SOFTWARE DOWNLOADS CONCURRENT WITH SYSTEM TESTING IN AN AUTOMATED PRODUCTION ENVIRONMENT

(75) Inventors: Russell L. Gillenwater, Round Rock, TX (US); Eric Hoxworth, Cedar Park, TX (US); Philip Brisky, Machaca, TX (US)

(73) Assignee: Dell USA L.P., Round Rock, TX (US)

(*) Notice: Subject to any disclaimer, the term of this patent is extended or adjusted under 35 U.S.C. 154(b) by 0 days.

(21) Appl. No.: 09/567,941

(22) Filed: May 10, 2000

(51) Int. Cl.$^7$ ................................................ G06F 11/00
(52) U.S. Cl. ......................... 714/36; 714/25; 717/174; 717/178
(58) Field of Search .............................. 714/25, 48, 36; 717/178, 174, 175; 700/97, 95; 702/123, 186

(56) References Cited

U.S. PATENT DOCUMENTS

| | | | |
|---|---|---|---|
| 5,353,240 A | 10/1994 | Mallory et al. | |
| 5,581,693 A | 12/1996 | Pecone | |
| 5,787,491 A | 7/1998 | Merkin et al. | |
| 5,875,293 A | 2/1999 | Bell et al. | |
| 5,894,571 A | 4/1999 | O'Connor | |
| 5,963,743 A | 10/1999 | Amberg et al. | |
| 5,991,543 A | 11/1999 | Amberg et al. | |
| 5,995,757 A | 11/1999 | Amberg et al. | |
| 6,279,155 B1 * | 8/2001 | Amberg et al. | 717/174 |
| 6,313,652 B1 * | 11/2001 | Maeng | 324/760 |
| 6,327,706 B1 * | 12/2001 | Amberg et al. | 717/174 |
| 6,418,541 B1 * | 7/2002 | Jeon | 714/36 |
| 2002/0095672 A1 * | 7/2002 | Evans et al. | 717/175 |

* cited by examiner

Primary Examiner—Scott Baderman
Assistant Examiner—Marc M Duncan
(74) Attorney, Agent, or Firm—Haynes and Boone, LLP

(57) ABSTRACT

Method and system for performing very high speed software downloads concurrent with system testing in an automated production environment and for test-sequencing in multi-tasking environments with consolidated automation and interactive operations is described. In one embodiment, during diagnostics and software download, a multi-tasking OS is booted on a target computer system, thereby enabling diagnostics to be run at the same time the software download is performed. A visual step-sequencing engine provides the ability to sequentially execute steps, as well as to execute steps in parallel and to combine parallel and sequential steps into loops. The sequencing engine provides a visual representation of the current run status of the target system in a Main window. The sequencing engine also integrates EMR debug tools into the same application so that EMR debug technicians can run failing steps directly from the application via an EMR Control window thereof and consolidates logs into a single location within the application viewable via a Logs window thereof.

29 Claims, 6 Drawing Sheets

SYSTEM AND METHOD FOR SEQUENCING AND PERFORMING VERY HIGH SPEED SOFTWARE DOWNLOADS CONCURRENT WITH SYSTEM TESTING IN AN AUTOMATED PRODUCTION ENVIRONMENT

This application relates to co-pending U.S. patent application Ser. No. 09/277,062, filed on Mar. 26, 1999, entitled FACTORY SOFTWARE MANAGEMENT SYSTEM naming Joe Bryan, Steve Romohr, Jon Boede, Gaston M. Barajas and Paul J. Maia as inventors. The application is incorporated herein by reference in its entirety, and is assigned to the assignee of this invention.

This application relates to U.S. patent application Ser. No. 09/315,657, filed on May 20, 1999, entitled METHOD AND APPARATUS FOR WINDOWS-BASED INSTALLATION FOR INSTALLING SOFTWARE ON BUILD-TO-ORDER COMPUTER SYSTEMS naming Bobby G. Doran, Jr., Bill Hyden and Terry Wayne Liles as inventors. The application is incorporated herein by reference in its entirety, and is assigned to the assignee of this invention.

This application relates to U.S. patent application Ser. No. 09/333,786, filed on Jun. 15, 1999, entitled METHOD AND APPARATUS FOR TESTING CUSTOM-CONFIGURED SOFTWARE/HARDWARE INTEGRATION IN A COMPUTER BUILD-TO-ORDER MANUFACTURING PROCESS naming Thomas Vrhel, Jr., Gaston M. Barajas, Paul J. Maia and Todd Nix as inventors. The application is incorporated herein by reference in its entirety, and is assigned to the assignee of this invention.

BACKGROUND

The disclosures herein relate generally to automated production environments and, more particularly, to a technique for performing very high speed software downloads concurrent with system testing in such an environment.

Historically, computer manufacturers have tested computer systems in production under DOS. There are several problems with this. First, because DOS is not a multi-tasking operating system, as the complexity of the computer systems being tested increases and more tests are required, the time required to perform those tests also increases, resulting in reduced manufacturing throughput. Second, DOS does not support testing of certain types of systems, such as Symmetrical Multi-Processor ("SMP") systems and RAID controllers, which must be tested under a multi-tasking operating system. Finally, DOS will not execute under 64-bit processors shipped on certain computer systems; a multi-tasking operating system will be necessary to properly test such systems.

A process has been developed to solve the above-noted problems; namely, to provide support for components that could not be tested under DOS and to reduce test times through parallel testing. This process, referred to herein as "WinTest", installs from DOS onto a target system, and then boots to a multi-tasking OS, such as Windows NT Server, Enterprise Edition ("NTSE"), available from Microsoft Corporation, Redmond, Wash., launches and runs Windows-based diagnostics, and then boots back to DOS. However, in running applications and tests under a multi-tasking environment, there are three fundamental problems, including (1) how to control the application or test, (2) how to determine pass/fail status for the application or test, and (3) how to communicate this status to the WinTest architecture.

In a DOS environment, the foregoing tasks are fairly simple. Most applications are controlled through command line parameters or configuration files; pass/fail status is typically returned through an ERRORLEVEL environment variable; and the only installation/removal involves adding/deleting files. Working under a multi-tasking environment, such as NTSE, however, is much more complicated. Each application is controlled differently, often through mouse/keyboard events, each application determines pass/fails status differently, often by opening/closing windows, changing window contents, and creating files, for example, and installing applications often requires manipulation of the registry, base files, and shared files and ActiveX Servers. Thus, there is no standard way to integrate applications/tests into the automated production environment.

An additional problem suffered in the DOS environment is that production-installed software is downloaded in the burnracks in a sequential manner. Accordingly, as the size of the software installs continues to grow, the download times also continue to increase, which reduces production speeds and increases cost-per-system. While network speed increases can help to alleviate this problem to some extent, at some point, the download becomes limited to the performance of the hard drive on the client system and download times increase linearly with download sizes. There is currently no means to reduce the impact of the software downloads once the client hard drive limit has been reached.

In the build-to-order environment, each system executes a unique set of process steps in production. In the DOS environment, this sequence is specified in a "step file" and the actual sequencing is controlled by an application referred to as "RunStep." RunStep, however, only provides sequential step execution. Under WinTest, each production system has a multi-tasking OS, such as NTSE, installed in the burnracks and multiple diagnostics (over 20) are run in parallel. The ability to run these diagnostics in parallel significantly reduces total test time (by over ten hours in the case of servers), which provides a large competitive advantage. However, RunStep does not provide the ability to execute steps in parallel. Further, in the DOS environment, the step execution, status display, test log viewing, and Electromechanical Repair ("EMR") debug tools are deployed as separate tools. This requires extensive EMR training, adds significant overhead to the EMR process, and makes it impossible to determine the location of the system in the overall test process while it is running.

Therefore, what is needed a system that enables software downloads to be performed in parallel with system testing and that provides a sequencing engine that enables the execution of "steps" in parallel under a multi-tasking OS, such as NTSE.

SUMMARY

One embodiment, accordingly, provides a method and system for performing very high speed software downloads concurrent with system testing in an automated production environment and for test-sequencing in multi-tasking environments with consolidated automation and interactive operations. To this end, performing high-speed software downloads to and diagnostic testing of a target computer system in a manufacturing environment includes booting the target computer system to a multi-tasking operating system and launching a step sequencing engine application. The step sequencing engine application simultaneously launches a diagnostics platform and a software download manager. The diagnostics platform initiates a plurality of diagnostic tests to be performed on the target computer system and the software download manager simultaneously launches a software download tool for downloading customer software to a hard drive of a target computer system. Upon completion of the diagnostic tests and the customer software downloading, the target computer system reboots to DOS.

A technical advantage is that software downloads and diagnostics can be performed on an target system in parallel, thereby significantly reducing the time required to complete testing and software downloads and increasing production throughput.

Another technical advantage is that all of the tools necessary to debug a target system are combined into the sequencing engine, thereby significantly reducing the amount of time needed to debug a target system.

Yet another technical advantage is that logs are consolidated and given descriptive names such that a variety of logs can be accessed from a single Log View window of the WinStep application.

Yet another technical advantage is that problematic steps can be rerun from an EMR Control window of the WinStep application.

BRIEF DESCRIPTION OF THE DRAWING FIGURES

FIG. 1 is a block diagram of a software installation and testing system embodying features of one embodiment.

FIGS. 1A–1C respectively are process flow diagrams illustrating operation of various embodiments, including a prior art embodiment (FIG. 1A).

DETAILED DESCRIPTION

Figure 1:
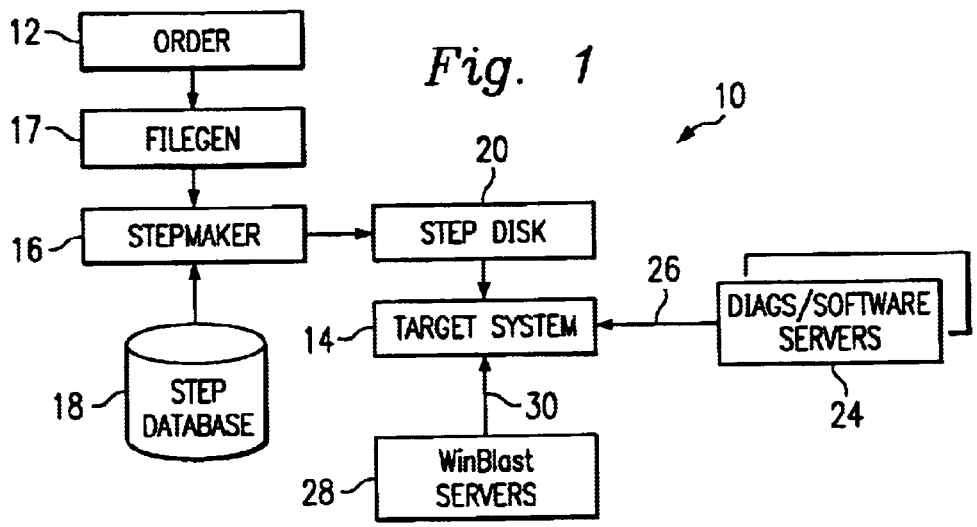
FIG. 1D is a flowchart of the operation of the system of FIG. 1.
FIG. 1E is a block diagram illustrate parallel processes performed according to one embodiment.

FIG. 1 is a schematic diagram of a software installation and testing system 10 embodying features of an embodiment-described herein. In particular, as will be described in greater detail below, the system 10 enables the simultaneous downloading of software to and diagnostics testing of a build-to-order computer system. In particular, an order 12 is placed to purchase a target computer system 14. Target system 14 is to be manufactured to contain a plurality of hardware and software components. For instance, target system 14 might include a certain brand of hard drive, a certain type of monitor, a certain brand of processor, and a particular version of a selected operating system. Before the target system 14 is shipped to the customer, the plurality of components are installed and tested. Such software installation and testing advantageously ensures a reliable, working computer system that is ready-to-run upon receipt thereof.

Because different families of computer systems and different individual computer components require different software installation and testing steps, it is necessary to determine which tests need to be run on the target system 14 and in what order those tests should be executed so as to achieve an effective software installation and testing process. As described in U.S. Pat. Nos. 5,963,743, 5,991,543, and 5,995,757, a step maker 16 is a computer system configured to sequence the software installation and testing steps to be run on the target system 14. In particular, the order 12 is provided to a Filegen system 17, which transforms the order into manufacturing information stored as files. Additionally, a step database 18 includes a supserset of all available steps to run on a given type of manufactured system.

The manufacturing information is provided by the Filegen system 17 to the stepmaker 16, which determines which step to run by filtering the step database 18 based on the manufacturing information. WinTest and WinBlast are included in the step database 18 as steps to be run. To sequence the software installation and testing steps, as determined by the foregoing process, the step maker 16 writes a series of output files, including a step file, to a step disk 20 in a manner similar to that described in the aforementioned U.S. Patents, except that the steps are written such that several may be executed in parallel, as will be described. As shown and described in FIG. 2 below, the step file contains command lines appropriate for executing the appropriate software installation and/or testing steps on the target system 14. The execution is performed in a predetermined, although not strictly sequential, order as will be described in greater detail below. The step disk 20 accompanies the target system 14 on the factory floor. As will be described in greater detail below, during a quick test ("QT") phase, the target system 14 is booted from the step disk 20 and DOS tests are run from one or more diagnostics/software servers 24 connected to the target system 14 via a network connection 26 under the direction of instructions contained on the step disk 20. Preferably, the network connection 26 is a generic network device plugged into a corresponding network port of the target system 14. Following the execution of the software installation and testing steps, results are logged back to the diagnostics/software servers 24 over the network connection 26.

In accordance with the embodiments described herein, one or more WinBlast servers 28 are also connected to the target system 14 via a network connection 30. An image of LeanNT is stored on the WinBlast servers 28 for downloading to the floating partition on the hard drive of the target system 14 as will be described. Each WinBlast server 28 is a high speed server that is highly tuned for software download. Software to be downloaded to the target system 14 under the control of the step disk 20, as will also be described, is stored on the WinBlast servers 28 as well. Results of diagnostics performed during WinBlast (FIG. 1D) are also logged back to the WinBlast servers 28 via the network connection 30.

Figure 1A:
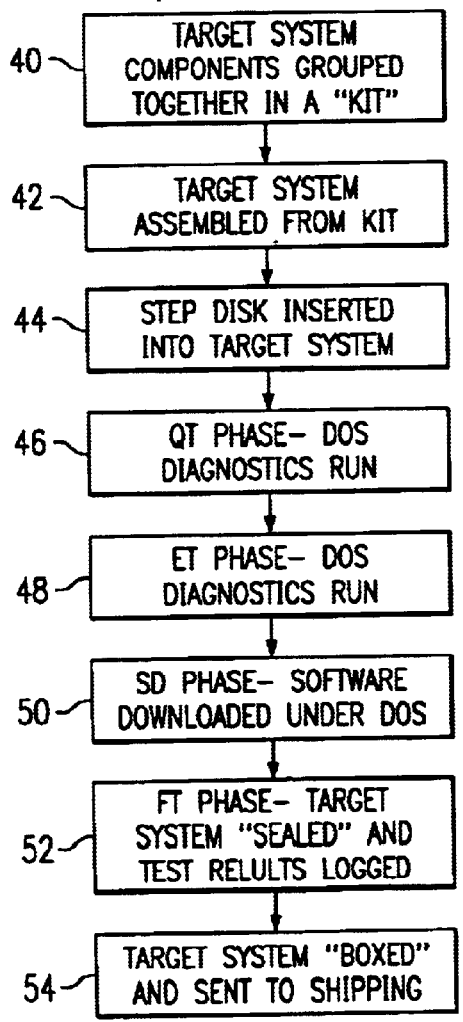
Figure 1B:
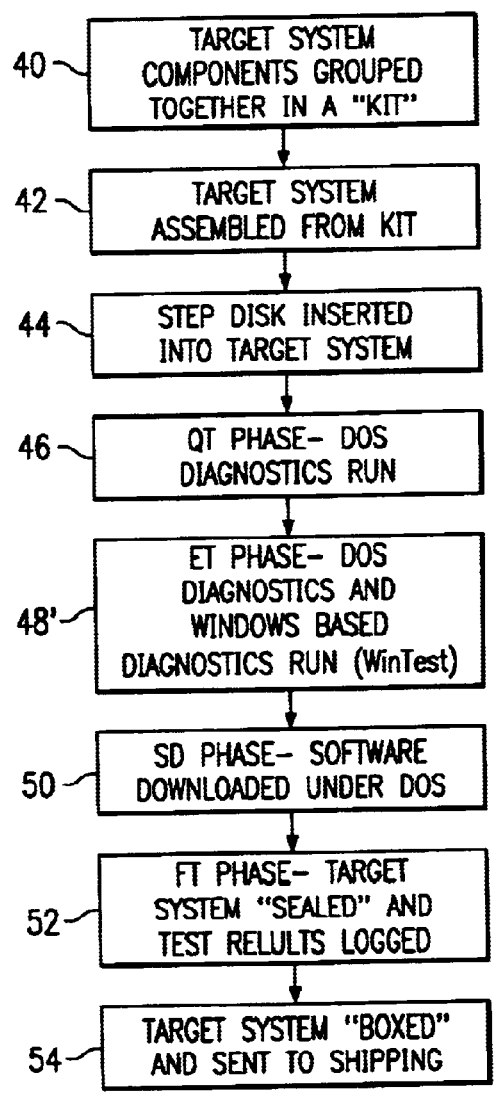
Figure 1C:
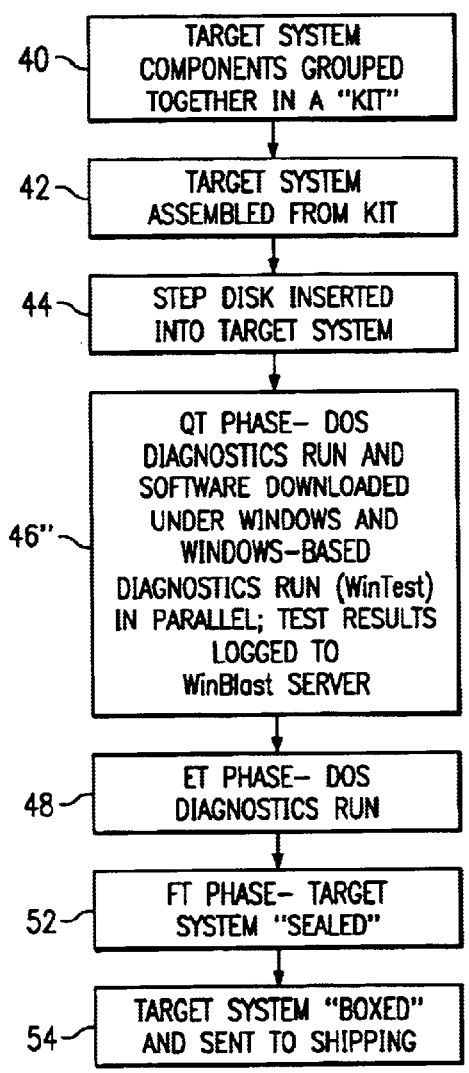

FIGS. 1A–1C are process flow diagrams illustrating a build-to-order process as performed without WinTest or WinBlast (i.e., under DOS alone), with WinTest but without WinBlast, and with both WinTest and WinBlast, respectively. FIGS. 1A–1C illustrate how the addition of first WinTest, and then both WinTest and WinBlast significantly accelerate the build-to-order process. In each of FIGS. 1A–1C, identical reference numerals will be used to designate identical steps.

Referring to FIG. 1A, in step 40, the components of the target system 14, including the step disk 20, are grouped together in an assembly kit. In step 42, the target system 14 is assembled from the assembly kit. In step 44, the step disk 20 is inserted into the assembled target system 14. In step 46, the target system 14 enters a Quick Test ("QT") phase, in which DOS diagnostics are run in the order specified on the step disk 20. As previously indicated, because in this step, the diagnostics are run under DOS, each test is necessarily executed sequentially, rather than multiple tests being executed simultaneously. Upon completion of the QT phase, in step 48, the target system 14 enters an Extended Test ("ET") phase, in which additional DOS diagnostics are run in the order specified on the step disk 20. Upon completion of the ET phase, in step 50, the target system 14 enters a Software Download ("SD") phase, in which software is downloaded to the hard drive of the target system. Once all of the software has been downloaded, in step 52, the target system 14 enters a final test ("FT") phase, in which the system is sealed and the test results are logged back to the diagnostics/software servers 24. Finally, in step 54, the target system 14 is boxed and sent to shipping, where it will be shipped to the customer.

Performing testing/diagnostics and software download under DOS alone, as illustrated in FIG. 1A, takes approximately five hours to complete.

FIG. 1B illustrates a build-to-order process in which WinTest is employed. Steps 40–46 proceed as described above with reference to FIG. 1A. Upon completion of the QT phase, in step 48', the target system 14 enters the ET phase, in which DOS diagnostics are run. In addition, Windows-based diagnostics are run under the control of the WinTest sequencing engine 78. Upon completion of step 48', steps 50–54 proceed as described in connection with FIG. 1A.

It will be recognized that a fairly significant time savings is realized in the embodiment illustrated in FIG. 1B through the ability in step 48' to execute Windows-based diagnostics in parallel under WinTest. Specifically, the software download and testing can be performed in approximately three hours using the system represented in FIG. 1B.

Referring now to FIG. 1C, which illustrates a build-to-order process in which both WinTest and WinBlast are employed, steps 40–44 proceed as described above with reference to FIGS. 1A and 1B. In step 46", the target system 14 enters the QT phase and DOS diagnostics are run. In addition, software download and execution of Windows-based diagnostics are performed in parallel under WinTest and test results are logged back to the WinBlast servers 28. Upon completion of QT, in step 48, the target system 14 enters the ET phase and DOS diagnostics are run. Upon completion of the ET phase, steps 52 and 54 are performed as described above with reference to FIGS. 1A and 1B.

Performing testing and software download using the system represented in FIG. 1C takes approximately 1.5 hours to complete, resulting in a significant time savings over the systems represented in FIGS. 1A and 1B.

Figure 1D:
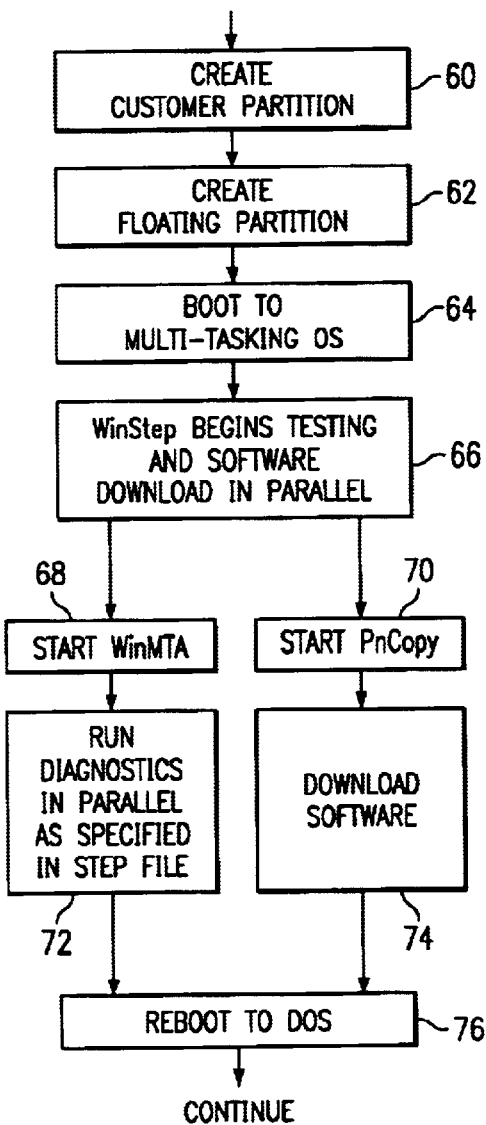
Figure 1E:
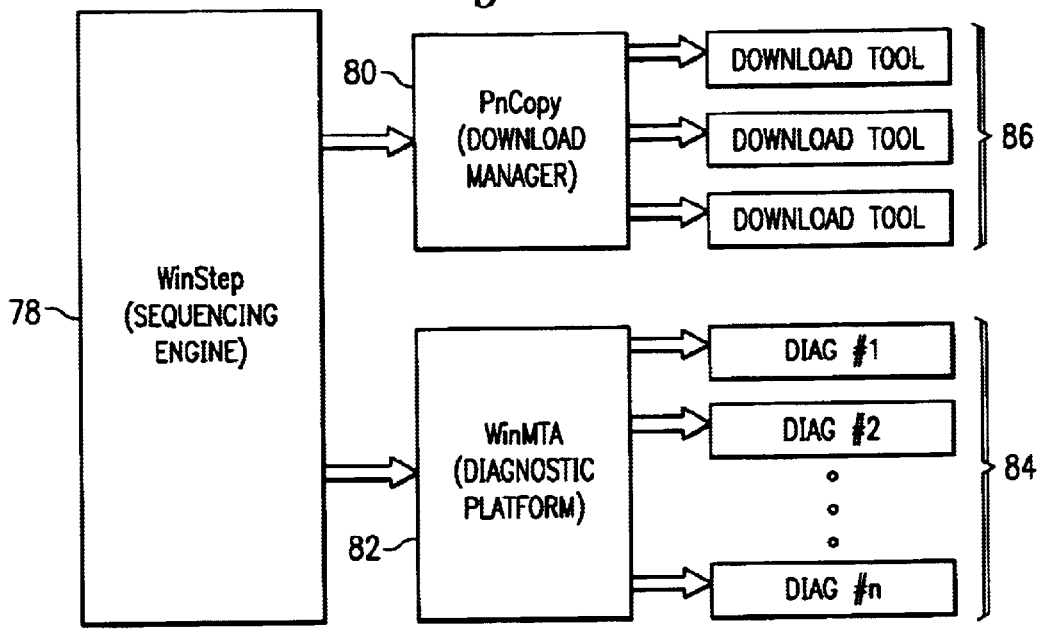

FIG. 1D is a flowchart of the operation of the WinBlast process in the system 10. In step 60, a customer partition is created on the hard disk of the target system 14. In step 62, a floating partition is created on the hard disk and a multi-tasking OS, such as Windows NTSE or LeanNT, described above, is installed thereon from the WinBlast servers 28 per a corresponding command line on the step disk 20. In step 64, the target system 14 is booted to a multi-tasking OS, such as Windows NTSE. Referring now also to FIG. 1E, in step 66, the WinStep sequencing engine 78 is downloaded to the target system 14 from the WinBlast servers 28 and begins execution. In particular, the WinStep sequencing engine 78 initiates testing and software download processes in connection with the target system 14. In step 66, the WinStep sequencing engine 78 starts a diagnostics platform, such as WinMTA, 80 while simultaneously, in step 70, the WinStep sequencing engine 78 starts a download manager application, such as pnCopy, 82. In step 72, a plurality of diagnostics 84 specified in the step file on the step disk 20, as described in greater detail below (FIG. 2); are executed in the order specified in the step file. Similarly, in step 74, pnCopy 82 initiates one or more download tools 86, such as PKUNZIP, and the designated software is downloaded to the customer partition. It should be emphasized that, in accordance with features of the preferred embodiment, the diagnostics testing is performed simultaneously with the software download.

In step 76, once all of the windows-based diagnostics have been run on and the software downloaded to the target system 14, the target system reboots to DOS, the floating partition, along with the OS stored thereon, is deleted, and the process continues as usual.

Figure 2:
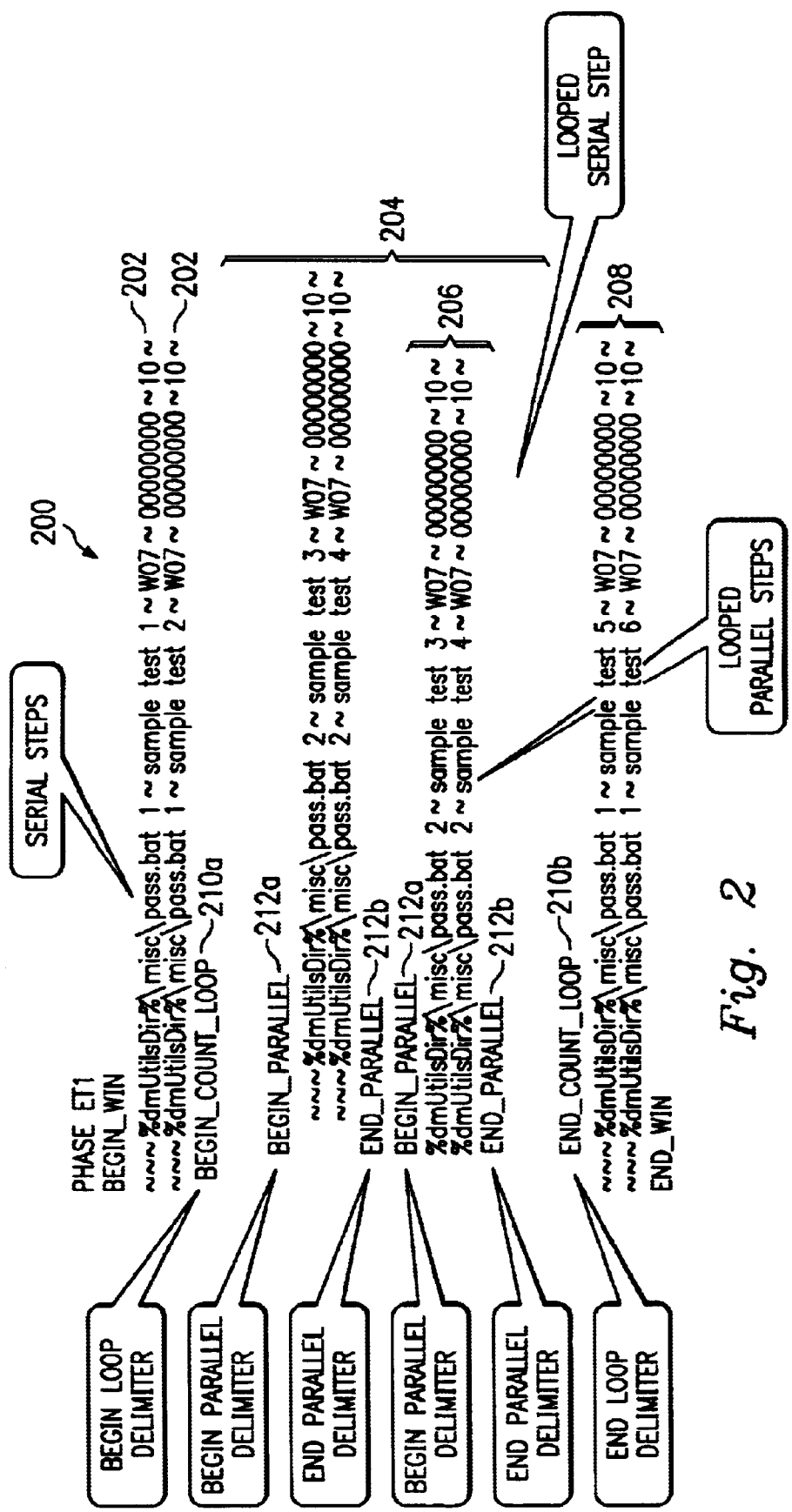
FIG. 2 illustrates a step file according to one embodiment.

FIG. 2 illustrates an exemplary step file 200 for use by the WinStep sequencing engine 78 in executing steps in parallel and combining parallel and sequential steps into loops. The step file 200 includes a plurality of serial steps 202 and a loop 204 including looped parallel steps 206 and a looped serial step 208. It will be noted that each loop, such as the loop 204, begins with a "Begin Loop Delimiter" 210*a* and ends with an "End Loop Delimiter" 210*b*. Similarly, each set of parallel steps, such as looped parallel steps 206, begins with a "Begin Parallel Delimiter" 212*a* and ends with an "End Parallel Delimiter" 212*b*. As previously noted, a step file configured for use with the WinStep sequencing engine 78, such as the step file 200, can be executed by the prior art RunStep engine in a DOS environment.

Figure 3:
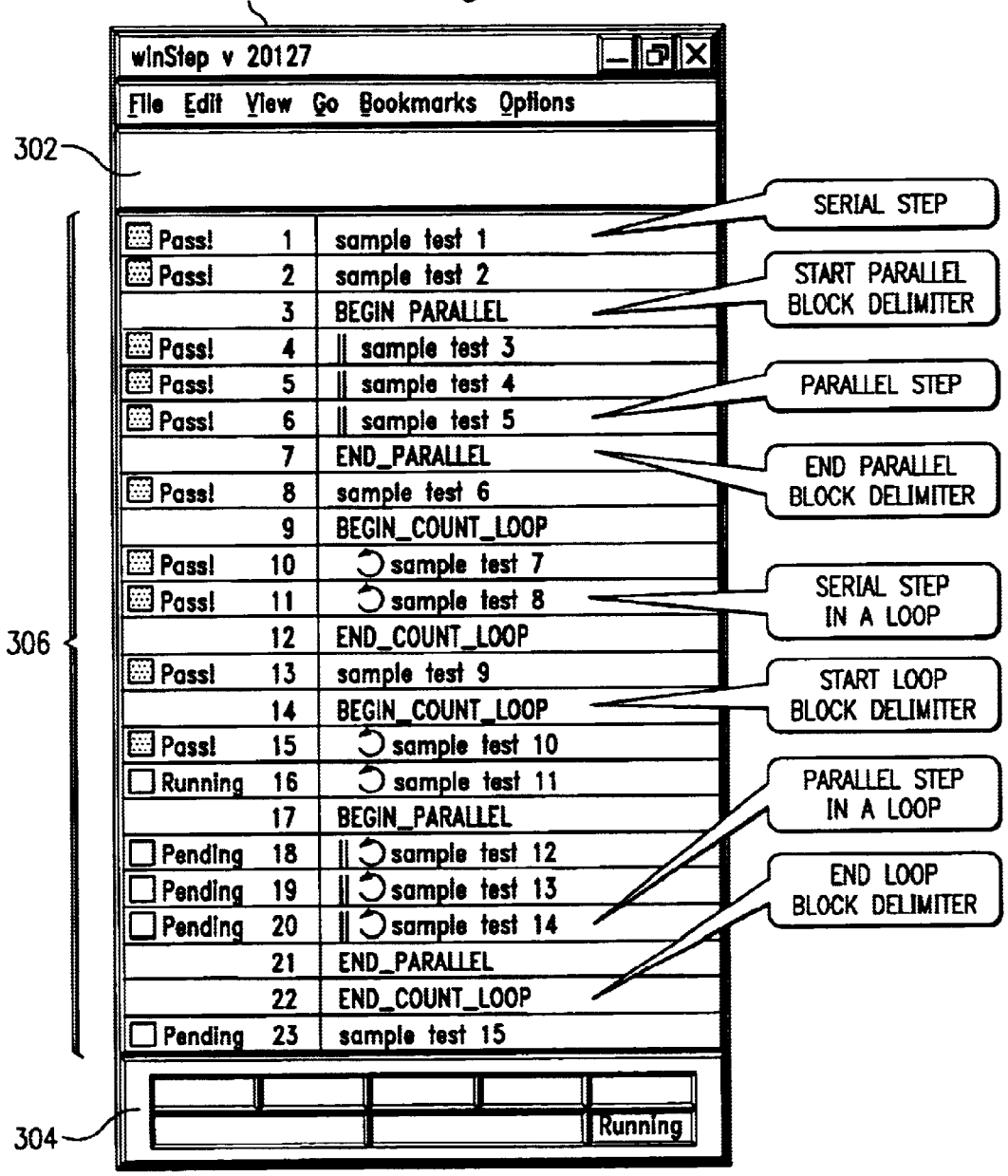
FIG. 3 illustrates a Main WinStep window generated using the system of FIG. 1.

FIG. 3 illustrates a Main window 300 generated by the WinStep sequencing engine. The Main window 300 contains information that can be divided into three categories, including system information (e.g., serial number, family name, model name, and type of OS currently running), which is displayed in a header portion 302 of the Main window; run status information (current phase, current loop, current step, elapsed step time, elapsed run time, WinStep status, and access mode), which is displayed in a footer portion 304 of the Main window; and step information (e.g., step status, SEN, step description, parallel and loop indicators) which is displayed in a body 306 of the Main window.

The step information shown in the body 306 of the Main window 300 corresponds to the step file 200 of FIG. 2. Each step, or line, of the step file 200 is listed on a separate line of the body 306 of the Main window 300 under a column headed "Description". In addition, for each step, an entry in a "Status" column indicates a status of the corresponding test, including "Pass," if the target system passed the test; "Fail," if the target system failed the test, "Running," if the corresponding test is currently being executed, or "Pending," if the corresponding test has not yet been initiated. Additionally, a Step Execution Number, or "SEN," for uniquely identifying each test is listed in a column headed "SEN".

Figure 4:
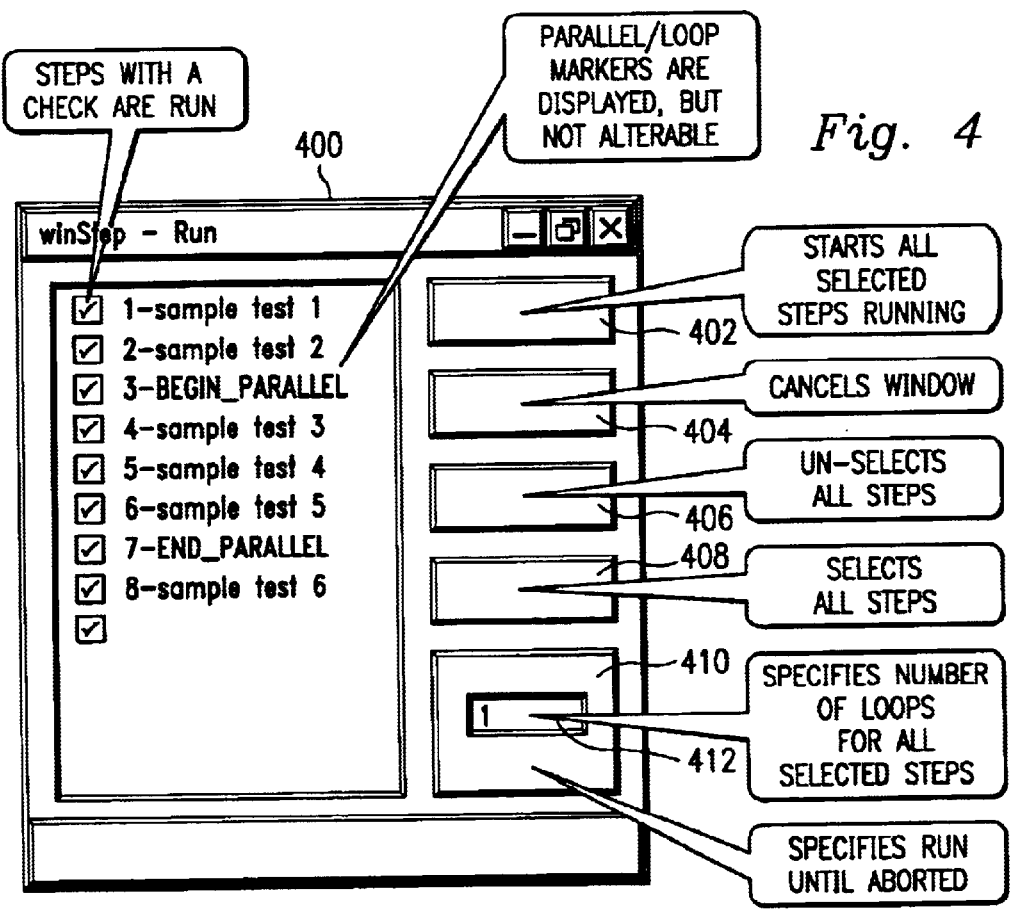
FIG. 4 illustrates an EMR Control window generated using the system of FIG. 1.

FIG. 4 illustrates an exemplary EMR Control window 400. The EMR Control 25 window 400 contains a list of the steps specified in the step file 200. An EMR technician can specify certain steps to be run by checking a checkbox corresponding to the step(s) and then selecting a "Start" button 402, at which point all selected steps are run as specified. Selecting a "Cancel" button 404 exits the EMR Control window 400; selecting an "Unselect All" button 406 unselects all of the steps; and selecting a "Select All" button 408 selects all of the steps. A "Loops" field 410 indicates the number of loops for all specified steps; selecting "Continuous" 412 causes the steps to be run until aborted.

The EMR window is accessed via the menu bar of the Main window 300.

Figure 5:
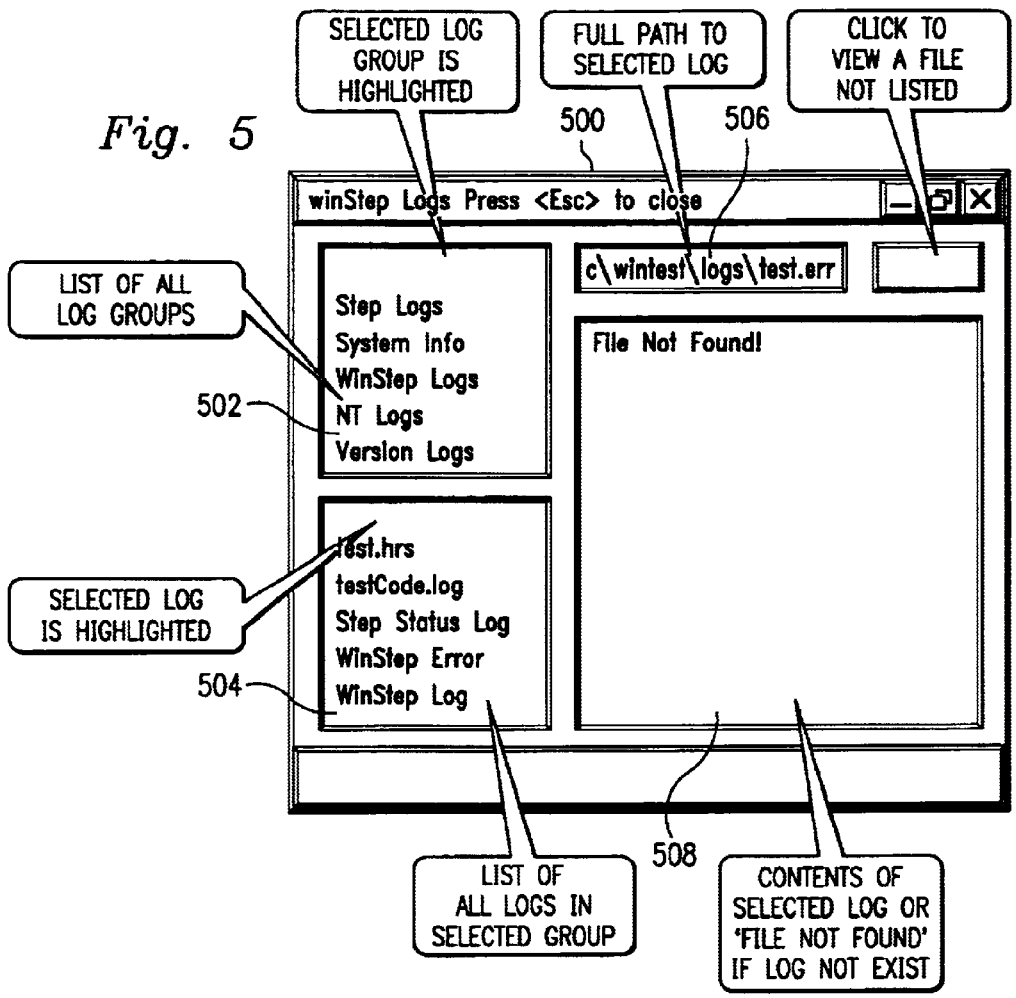
FIG. 5 illustrates a Logs window generated using the system of FIG. 1.

FIG. 5 illustrates a Logs window 500. As previously described, the WinStep sequencing engine 78 reduces debug times by consolidating all logs into a single location viewable via the Logs window 500. In a preferred embodiment, the logs are combined into functional groups and each log is given a descriptive name, such that the technician can view the contents of the a log simply by clicking on its name.

For example, referring to the Logs window 500, a user can select a log group from a "Group" listing 502 by highlighting the name of a group displayed therein, such as "Test Logs". The logs included in the selected group are then displayed in a "File" listing 504. Selecting one of the logs displayed in the File listing 504, such as "test.err", results in the display of the full path to the selected log in a "Location" field 506, as well as the contents of the selected log in a "Contents" field 508.

The Logs window 500 is accessed from the Main window (FIG. 3).

During debugging of a system that fails one or more diagnostics tests, as indicated in the Main window 300, a EMR technician may access the Logs window 500 to select and view selected logs in an attempt to determine what caused the failure. Once the problem is thought to be solved, the technician can access the EMR Control window 400 to rerun the failed test(s), as well as any other tests, on the system until the system is completely debugged. Clearly, the ability to access all of the debug tools from a single application (i.e., WinStep) provides a significant advantage over having to use multiple, non-integrated debug tools.

Figure 6:
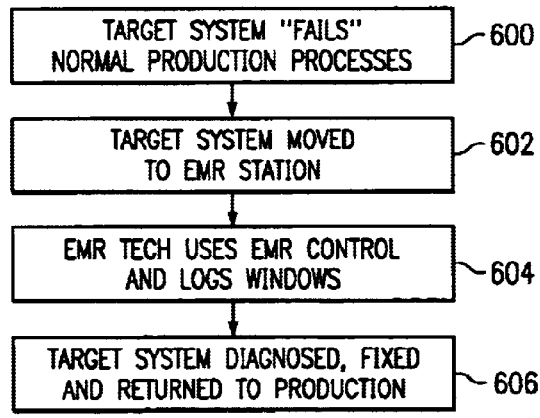
FIG. 6 is a process flow diagram illustrating an EMR process of one embodiment.

FIG. 6 is a process flow diagram illustrating the debug, or EMR, process. In step 600, it is determined that a target system, such as the target system 14, has failed normal production process. In step 602, the system 14 is moved to an EMR station (not shown) and connected to the diagnostics/software servers 24 and the WinBlast servers 28 via conventional network connections, such as the network connections 26 and 30, respectively. In step 604, an EMR technician deploys WinStep from the EMR Control window 400 and accesses logs via the Logs window 500 to debug the system 14. In step 606, the system 14 is diagnosed, repaired, and moved back into the normal production flow.

There are several ancillary advantages to performing software downloads under NTSE, including 32-bit NIC drivers, 32-bit hard drive access, true preemptive multi-tasking for efficient switching between the download and diagnostic tasks, a much larger RAM drive and cache than is available under DOS, and a 32-bit version of PKUNZIP. Combined with a unique network topology, this aspect permits download speeds that are limited only by the performance of the hard drive of the target system and is therefore approximately eleven (11) times faster than DOS in the burnracks today.

This aspect utilizes several components to make the parallel download possible, including a compact version of NTSE ("LeanNT"), a proprietary partition manipulation tool for creating a "floating", or "overlay", partition, and a Windows-based sequencing engine application, described in greater detail below and referred to herein as "WinStep". LeanNT is a compact, customized version of NTSE that downloads and boots very quickly (e.g., in under one minute) and provides high-speed network and disk access to a computer system. The process begins for each target system by creating the customer partition on the hard drive thereof, after which a small "floating" partition is created. LeanNT is downloaded to this floating partition and the target system is booted to LeanNT. Once the target system is booted to LeanNT, the sequencing engine, i.e., WinStep, begins the testing and software download as parallel processes. A Windows diagnostics platform, referred to as "WinMTA", manages the test sequencing. WinMTA runs several diagnostics (up to 21, in some cases) concurrently. At the same time, the WinStep sequencing engine launches a download manager application, such as pnCopy, which in turn launches one or more software download tools, such as PKUNZIP, as necessary to perform the actual software download to the customer partition.

As alluded to above, the WinStep sequencing engine provides the ability to sequentially execute steps; however, unlike the aforementioned prior art RunStep application, the WinStep sequencing engine also provides the ability to execute steps in parallel and to combine parallel and sequential steps into loops, which features are essential for running diagnostics in parallel. In operation, the WinStep sequencing engine reads a step sequence from a "step file" and can extract Windows-based steps from the same step file used in the DOS process, thus making it possible to have a single step file define both the DOS and Windows step sequencing. When running steps in parallel, it is possible to run multiple instances of the same step at the same time. For example, on a multi-processor server, the WinStep sequencing engine can run eight CPU diagnostics at the same time, each of which has the same name. In the DOS environment, there is no way distinguish these steps from each other, and thus, the Win-Step sequencing engine introduces the concept of a "Step Execution Number", or "SEN", for doing so. The SEN is a sequential number applied to each step in the step file. The SEN becomes important as it is used to reference run status and step logs during the debugging process, as described below.

In addition to enabling parallel step execution, the Win-Step application provides a visual representation of the current run status of the target system in a Main window. This Main window provides much information critical to rapid system debug and status determination. The information provided can be broken down into three main categories, including system information (e.g., serial number, family name, model name, and type of OS currently running), which is displayed in a header of the Main window; run status (current phase, current loop, current step, elapsed step time, elapsed run time, WinStep status, and access mode), which is displayed in a footer of the Main window; and step information (e.g., step status, SEN, step description, parallel and loop indicators) which is displayed in a body of the Main window. This information significantly reduces EMR debug time and eliminates confusion by operators. There is no runtime equivalent of this functionality in the DOS environment.

The WinStep application also integrates EMR debug tools into the same application so that EMR debug technicians can run failing steps directly from the WinStep application via an EMR Control window. This is much more efficient than the DOS process, in which the technicians must break out of the RunStep application and run a separate application to restart the process.

Moreover, WinStep reduces debug times by consolidating all logs into a single location within the application viewable via a Logs window. In contrast, in the DOS environment, there are dozens of logs that are scattered across different locations. The only way for a technician to view the logs is to TYPE them or to use a paging version of TYPE referred to as "TTYPE". They can only view one log at a time and must know the exact location and name of the log to view it. Most technicians are unaware of at least 50% of the logs available in DOS, as there is no documentation on their location and functionality. To eliminate this problem, WinStep consolidates the logs into functional groups and each log is given a descriptive name, such that the technician can view the contents of the a log simply by clicking on its name. Logs can be viewed while the WinStep sequencing engine is running, thereby significantly reducing EMR debug times.

Accordingly, the embodiments illustrated and described herein enable software downloads to be performed in parallel with system testing and that provides a sequencing engine that enables the execution of "steps" in parallel under a multi-tasking OS, such as NTSE or LeanNT.

Although illustrative embodiments have been shown and described, a wide range of modification, change, and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of performing high-speed software downloads to and diagnostics testing of a target computer system in a manufacturing environment, the method comprising:
    booting the target computer system to a multi-tasking operating system ("OS");
    launching a step sequencing engine application;
    the step sequencing engine application simultaneously launching a diagnostics platform and a software download manager;
    the diagnostics platform initiating a plurality of diagnostics tests to be performed on the target computer system and the software download manager simultaneously launching a software download tool for downloading customer software to a hard drive of the target computer system; and
    upon completion of the diagnostics tests and the customer software downloading, rebooting the target computer system to DOS.

2. The method of claim 1 wherein two or more of the diagnostics tests are performed in parallel.

3. The method of claim 1 wherein an order and sequence in which the diagnostics tests are performed are specified in a step file associated with the target computer system.

4. The method of claim 1 further comprising:
    creating a customer partition on the hard drive of the target computer system;
    creating a floating partition on the hard drive of the target computer system;
    wherein the multi-tasking OS is stored on the floating partition; and
        wherein the customer software is downloaded to the customer partition.

5. The method of claim 4 wherein the floating partition is deleted subsequent to the rebooting the target computer system to DOS.

6. The method of claim 1 further comprising logging results of each of the diagnostics tests to a server connected to the target computer system.

7. The method of claim 1 further comprising, responsive to failure by the target computer system of one or more of the diagnostics tests, debugging the target computer system using tools integrated into the step sequencing engine application.

8. The method of claim 7 wherein the debugging comprises opening a Main window of the step sequencing engine application to view results of the diagnostics tests.

9. The method of claim 8 wherein the debugging further comprises accessing an EMR Control window of the step sequencing engine application and rerunning specified diagnostics tests on the target computer system directly from the EMR Control window.

10. The method of claim 8 wherein the debugging further comprises accessing a Logs window of the step sequencing engine application and accessing logs associated with the results of the diagnostics tests performed on the target computer system directly from the Logs window.

11. A system for enabling the performance of high-speed software downloads to and diagnostics testing of a target computer system in a manufacturing environment, the system comprising:
    means for booting the target computer system to a multi-tasking operating system ("OS");
    means for launching a step sequencing engine application for simultaneously launching a diagnostics platform and a software download manager;
    wherein the diagnostics platform initiates a plurality of diagnostics tests to be performed on the target computer system and the software download manager simultaneously launches a software download tool for downloading customer software to a hard drive of the target computer system; and
    means for rebooting the target computer system to DOS upon completion of the diagnostics tests and the customer software downloading.

12. The system of claim 11 wherein two or more of the diagnostics tests are performed in parallel.

13. The system of claim 11 further comprising a step file associated with the target computer system, wherein an order and sequence in which the diagnostics tests are performed are specified in the step file.

14. The system of claim 11 further comprising:
    means for creating a customer partition on the hard drive of the target computer system;
    means for creating a floating partition on the hard drive of the target computer system;
    wherein the multi-tasking OS is stored on the floating partition; and
    wherein the customer software is downloaded to the customer partition.

15. The system of claim 14 wherein the floating partition is deleted subsequent to the rebooting the target computer system to DOS.

16. The system of claim 11 further comprising means for logging results of each of the diagnostics tests to a server connected to the target computer system.

17. The system of claim 11 further comprising means integrated into the step sequencing engine application for debugging the target computer system responsive to failure by the target computer system of one or more of the diagnostics tests.

18. The system of claim 17 wherein the means for debugging comprises a Main window of the step sequencing engine application for displaying results of the diagnostics tests.

19. The system of claim 18 wherein the means for debugging further comprises an EMR Control window of the step sequencing engine application from which specified diagnostics tests on the target computer system can be directly rerun.

20. The system of claim 18 wherein the means for debugging further comprises a Logs window of the step sequencing engine application from which logs associated with the results of the diagnostics tests performed on the target computer system can be directly accessed.

21. A system for simultaneously performing diagnostics tests on and high-speed software downloads to a target computer in an automated production environment, the system comprising:
- a first server connected to the target computer via a first network connection, the first server containing a plurality of diagnostics tests available to be performed on the target computer;
- a second server connected to the target computer via a second network connection, the second server having stored thereon a plurality of software applications available to be downloaded to the target computer;
- a step disk associated with the target computer and having stored thereon a step file specifying an order and sequence in which diagnostics tests are to be performed on the target computer; and
- a step sequencing engine executable in a multi-tasking OS environment for simultaneously launching a diagnostics platform and a software download manager, the diagnostics platform initiating a plurality of diagnostics tests to be performed on the target computer as specified in the step file and the software download manager simultaneously launching a software download tool for downloading customer software to a hard drive of the target computer.

22. The system of claim 21 wherein the diagnostics platform initiates two or more of the diagnostics tests to be performed in parallel.

23. The system of claim 21 further comprising:
- means for creating a customer partition on the hard drive of the target computer;
- means for creating a floating partition on the hard drive of the target computer;
- wherein a multi-tasking OS is stored on the floating partition; and
- wherein the customer software is downloaded to the customer partition.

24. The system of claim 23 wherein the floating partition is deleted after all of the software applications are downloaded and the diagnostics tests have been performed.

25. The system of claim 21 wherein results of each of the diagnostics tests are logged to the second server.

26. The system of claim 21 wherein the step sequencing engine comprises tools for debugging the target computer responsive to failure by the target computer of one or more of the diagnostics tests.

27. The system of claim 26 wherein the tools for debugging comprise a Main window for displaying results of the diagnostics tests.

28. The system of claim 27 wherein the tools for debugging further comprise an EMR Control window from which specified diagnostics tests on the target computer can be directly rerun.

29. The system of claim 27 wherein the tools for debugging further comprise a Logs window from which logs associated with the results of the diagnostics tests performed on the target computer can be directly accessed.

* * * * *